(12) United States Patent
Saez et al.

(10) Patent No.: US 12,325,142 B2
(45) Date of Patent: Jun. 10, 2025

(54) HIGH ACCURACY ROBOTIC PLASMA CUTTING AND INSPECTION SYSTEM

(71) Applicant: GM GLOBAL TECHNOLOGY OPERATIONS LLC, Detroit, MI (US)

(72) Inventors: Miguel Arturo Saez, Clarkston, MI (US); John P. Spicer, Plymouth, MI (US); James W. Wells, Rochester Hills, MI (US); Chris A. Ihrke, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 486 days.

(21) Appl. No.: 17/943,644

(22) Filed: Sep. 13, 2022

(65) Prior Publication Data
US 2024/0083034 A1    Mar. 14, 2024

(51) Int. Cl.
*B25J 9/16* (2006.01)
*B23K 37/02* (2006.01)
*B23K 101/00* (2006.01)
*B25J 9/00* (2006.01)
*B25J 11/00* (2006.01)
(Continued)

(52) U.S. Cl.
CPC ......... *B25J 9/1697* (2013.01); *B23K 37/0229* (2013.01); *B25J 9/0009* (2013.01); *B25J 9/0093* (2013.01); *B25J 11/0055* (2013.01); *B25J 13/08* (2013.01); *G06K 7/1417* (2013.01); *G06T 1/0014* (2013.01); *G06T 7/0004* (2013.01); *G06T 7/70* (2017.01); *H04N 23/90* (2023.01); *B23K 2101/006* (2018.08); *G06T 2207/30108* (2013.01); *G06T 2207/30204* (2013.01); *G06T 2207/30248* (2013.01)

(58) Field of Classification Search
None
See application file for complete search history.

(56) References Cited

U.S. PATENT DOCUMENTS

| 11,173,609 B2* | 11/2021 | Lee .................. B25J 9/0084 |
| 2015/0343640 A1* | 12/2015 | Shi .................. B25J 9/1687 |
| | | 382/153 |

FOREIGN PATENT DOCUMENTS

| CN | 210060138 U * | 2/2020 |
| DE | 10 2007 036 585 A1 | 4/2009 |

(Continued)

OTHER PUBLICATIONS

German Office Action from counterpart DE102023110136.6, dated Jun. 28, 2024.

*Primary Examiner* — David Earl Ogg

(57) ABSTRACT

A vehicle frame inspection and cutting system includes: a frame moving device configured to support a vehicle frame and to transport the vehicle frame; an inspection robot including a first camera configured to capture first images of a side of the vehicle frame; a cutting robot configured to cut holes through vehicle frames and including an identifier disposed on an outer surface of the cutting robot; a second camera disposed vertically above the frame moving device, the inspection robot, and the cutting robot and configured to capture second images vertically downwardly; a control module configured to, based on the first images and the second images: move and actuate the cutting robot and position a cutting tool of the cutting robot at a target location on the vehicle frame; and cut a hole through the vehicle frame at the target location.

20 Claims, 4 Drawing Sheets

(51) Int. Cl.
*B25J 13/08* (2006.01)
*G06K 7/14* (2006.01)
*G06T 1/00* (2006.01)
*G06T 7/00* (2017.01)
*G06T 7/70* (2017.01)
*H04N 23/90* (2023.01)

(56) References Cited

FOREIGN PATENT DOCUMENTS

| | | |
|---|---|---|
| DE | 10 2016 014 944 A1 | 6/2018 |
| DE | 10 2014 209 371 B4 | 11/2018 |
| DE | 10 2021 114 598 A1 | 6/2022 |
| EP | 3 768 445 B1 | 12/2022 |
| WO | WO-2022195491 A1 * | 9/2022 |

* cited by examiner

HIGH ACCURACY ROBOTIC PLASMA CUTTING AND INSPECTION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle manufacturing and more particularly to robotic cutting and inspection systems and methods.

Materials, such as aluminum, steel, plastic, etc. are collected for manufacturing of vehicles. Metal parts of vehicles are created, such as using stamping and cutting machines. Examples of such parts include frames, doors, hoods, roofs, trunk lids, etc.

Vehicles may be created on an assembly line. On an assembly line, components of a vehicle or the vehicle itself is assembled as the component or vehicle moves from station to station. Various different components may be welded, fastened, and/or adhered together to manufacture a vehicle.

Detailing may also be performed during vehicle manufacturing. Detailing may include cleaning, applying one or more corrosion and/or scratch protections, painting, and one or more other processes.

SUMMARY

In a feature, a vehicle frame inspection and cutting system includes: a frame moving device configured to support a vehicle frame and to transport the vehicle frame; an inspection robot including a first camera configured to capture first images of a side of the vehicle frame; a cutting robot configured to cut holes through vehicle frames and including an identifier disposed on an outer surface of the cutting robot; a second camera disposed vertically above the frame moving device, the inspection robot, and the cutting robot and configured to capture second images vertically downwardly; a control module configured to, based on the first images and the second images: move and actuate the cutting robot and position a cutting tool of the cutting robot at a target location on the vehicle frame; and cut a hole through the vehicle frame at the target location.

In further features, the cutting tool is configured to cut holes using one of plasma cutting, laser cutting, and waterjet cutting.

In further features, a structure is configured to support the second camera vertically above the frame moving device, the inspection robot, and the cutting robot.

In further features, the structure includes hollow tubular members.

In further features, at least one of the hollow tubular members is filled with a material.

In further features, the material is sand.

In further features, posts of the structure are disposed on cement pads that are isolated from a floor below the frame moving device.

In further features, the control module is configured to: identify a datum on the side of the vehicle frame in at least one of the first images; and determine the target location based on a location of the datum.

In further features, the control module is configured to move and actuate the inspection robot to position the datum within a field of view of the first camera.

In further features, the control module is configured to set at least one of (a) a dimension of the hole at the target location and (b) a shape of the hole at the target location.

In further features, the control module is configured to: determine a location of the cutting tool based the identifier disposed on the outer surface of the cutting robot captured in one of the second images; and move and actuate the cutting robot and position the location of the cutting tool at the target location on the vehicle frame.

In further features, the control module is configured to determine a 6 degree of freedom pose of the vehicle frame based on the first images.

In further features, fiducials are disposed on a floor within a field of view of the second camera.

In further features, a track is included, where the frame moving device includes a guide configured to move along the track.

In further features, a stop is disposed at an end of the track, wherein a portion of the guide is configured to contact the stop.

In further features, the inspection robot includes an N degree of freedom robot, where N is an integer greater than or equal to 4.

In further features, the cutting robot includes an N degree of freedom robot, where N is an integer greater than or equal to 4.

In further features: a second inspection robot includes a third camera configured to capture third images of a second side of the vehicle frame; a second cutting robot configured to cut holes through vehicle frames and including a second identifier disposed on an outer surface of the second cutting robot; a third camera disposed vertically above the frame moving device, the second inspection robot, and the second cutting robot and configured to capture fourth images vertically downwardly, where the control module is further configured to, based on the third images and the fourth images: move and actuate the second cutting robot and position a second cutting tool of the second cutting robot at a second target location on the vehicle frame; and cut a second hole through the vehicle frame at the second target location.

In further features, a tool changing workstation is configured to receive the cutting tool from the cutting robot and to provide a second tool to the cutting robot.

In a feature, a vehicle frame inspection and cutting method includes: by a frame moving device, supporting a vehicle frame and transporting the vehicle frame; capturing first images of a side of the vehicle frame using a first camera of an inspection robot; using a second camera disposed vertically above the frame moving device, the inspection robot, and a cutting robot, capturing second images vertically downwardly; based on the first images and the second images, move and actuate the cutting robot and positioning a cutting tool of the cutting robot at a target location on the vehicle frame; and cutting a hole through the vehicle frame at the target location by the cutting robot.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present application involves an inspection and cutting station for vehicle frames during vehicle manufacture. The station includes one or more inspection robots configured to identify locations of identifiers (datums) on vehicle frames. A control module is configured to determine a 6 degree of freedom pose (DOF) of the vehicle frame and target locations where holes are to be cut in the vehicle frame based on data from the inspection robots and the locations of the identifiers.

One or more cutting robots have identifiers on or near end effectors of the cutting robot(s). The control module determines the position(s) of the end effector(s) based on the identifiers. This allows the position(s) of the end effector(s) to be accurately determined and controlled by the control module to cut the holes in the vehicle frame at the target locations. This provides for manufacturing flexibility and quality for producing medium to low volume vehicle frames to be processed using the inspection and cutting station.

Figure 1:
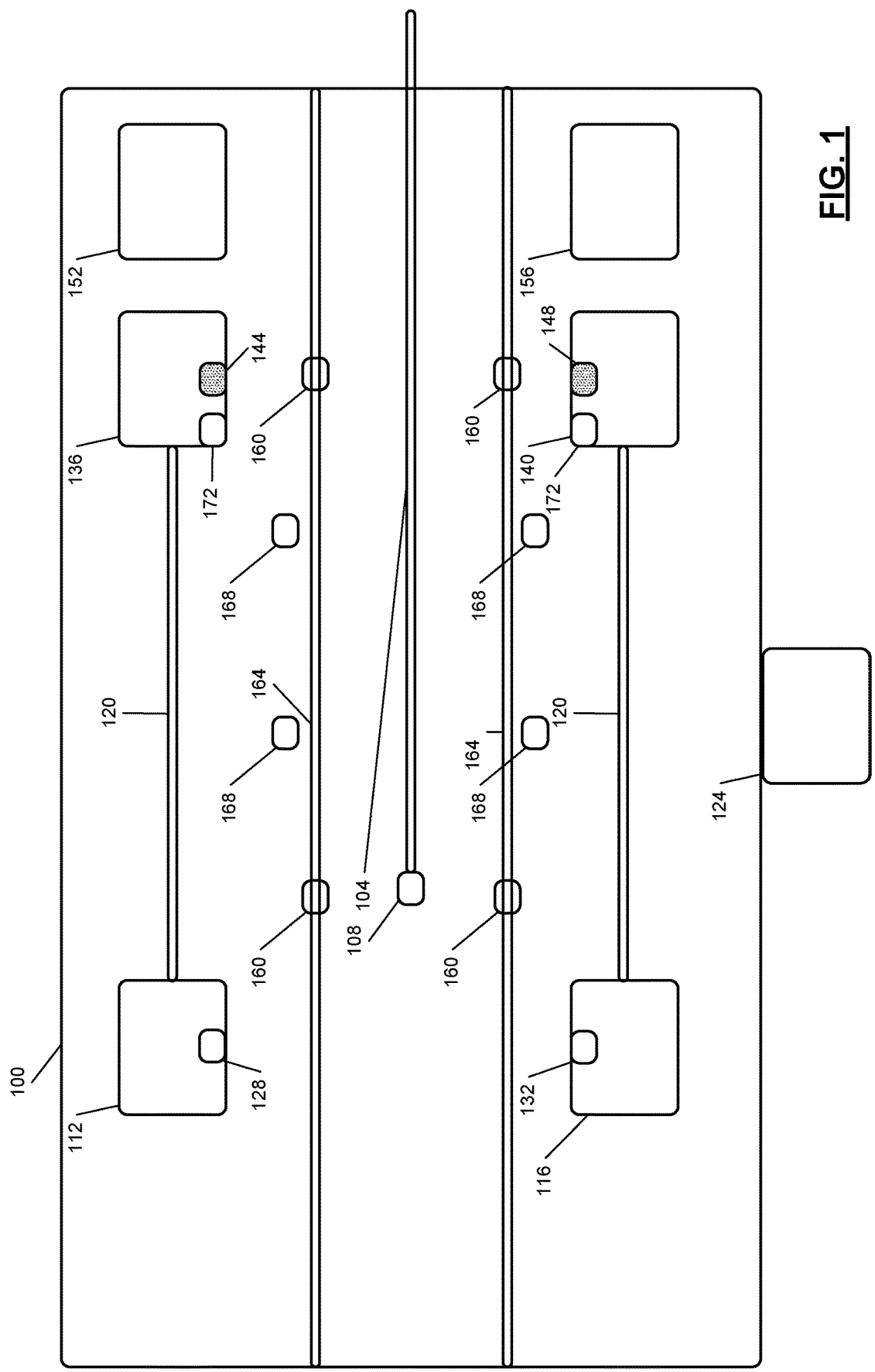
FIG. 1 is a functional block diagram of an example inspection and cutting system.

FIG. 1 is a top view and functional block diagram of an example inspection and cutting station (or system) 100 for vehicle frames. The station 100 may be disposed within a vehicle manufacturing plant of a vehicle original equipment manufacturer (OEM). The station 100 may be physically bounded by walls, numbered 100 in the example of FIG. 1. Walls may be provided on 3 sides and one or more doors may be disposed on a fourth side in various implementations.

The station 100 includes a track 104 that is disposed within or fixed to a surface of a floor of the station 100. A vehicle frame cart (discussed further below) can slides along the track 104 within the station 100. A stop 108 may be disposed at an end of the track 104 to stop further motion by vehicle frame carts within the track 104. The track 104 may also extend outside of the physical boundaries of the station 100 and through the door(s). The track 104 may be linear within the station 100.

A first inspection robot 112 may be disposed on a first side of the track 104 and a second inspection robot 116 may be disposed on a second side of the track 104 that is opposite the first side. The first and second inspection robots 112 and 116 are moveable linearly along lines (e.g., tracks) 120 that are parallel to the track 104. Movement of the first and second inspection robots 112 and 116 may be parallel to left and right (driver and passenger) sides of a vehicle frame on a frame cart on the track 104.

A control module 124 controls movement and actuation of the inspection robots 112 and 116. The control module 124 may be disposed outside of the physical boundaries of the station 100 in various implementations. The first inspection robot 112 may be, for example, a 6 DOF robot, a 7 DOF robot, or another suitable type of robot. The second inspection robot 116 may be, for example, a 6 DOF robot, a 7 DOF robot, or another suitable type of robot.

The first inspection robot 112 includes a first camera 128. Based on a position of the first inspection robot 112 (e.g., measured by sensors of the first inspection robot 112) and images from the first camera 128, the control module 124 may determine locations of identifiers (e.g., datums) on the first side of the vehicle frame on the vehicle frame cart. The position of the first inspection robot 112 and the images from the camera 128 may be transmitted to the control module 124 by wire or wirelessly.

The second inspection robot 116 includes a second camera 132. Based on a position of the second inspection robot 116 (e.g., measured by sensors of the second inspection robot 116) and images from the second camera 132, the control module 124 may determine locations of identifiers (e.g., datums) on the second side of the vehicle frame on the vehicle frame cart. The position of the second inspection robot 116 and the images from the camera 132 may be transmitted to the control module 124 by wire or wirelessly.

The control module 124 may determine a 6 DOF pose of the vehicle frame based on the positions of the first and second inspection robots 112 and 116 and the images from the cameras 128 and 132. Based on the positions of the identifiers on the vehicle frame and the 6 DOF pose of the vehicle frame, the control module 124 may determine target positions of for cutting tools to cut holes in the vehicle frame.

A first cutting robot 136 may be disposed on the first side of the track 104 and a second cutting robot 140 may be disposed on the second side of the track 104 that is opposite the first side. The first and second cutting robots 136 and 140 are moveable linearly along the lines (e.g., tracks) 120 that are parallel to the track 104. Movement of the first and second cutting robots 136 and 140 may be parallel to left and right (driver and passenger) sides of the vehicle frame on the frame cart on the track 104. The first cutting robot 136 may be, for example, a 6 DOF robot, a 7 DOF robot, or another suitable type of robot. The second cutting robot 140 may be, for example, a 6 DOF robot, a 7 DOF robot, or another suitable type of robot. The control module 124 controls movement and actuation of the first and second cutting robots 136 and 140.

The first cutting robot 136 includes an identifier 144 disposed on or near the end effector configured to grasp tools. The identifier 144 is disposed on the first cutting robot 136 as to be (e.g., at all times) visible from above the first cutting robot 136. The identifier 144 may be, for example, a QR code or another suitable type of visual identifier. The second cutting robot 140 includes an identifier 148 disposed on or near the end effector configured to grasp tools. The identifier 144 is disposed on the second cutting robot 140 as to be (e.g., at all times) visible from above the second cutting robot 140. The identifier 148 may be, for example, a QR code or another suitable type of visual identifier.

The first cutting robot 136 may cut holes in vehicle frames using plasma (e.g., air or water cooled), laser, water, or another suitable type of cutting. The second cutting robot 140 may cut holes in vehicle frames using plasma (e.g., air or water cooled), laser, water, or another suitable type of cutting. The first and second cutting robots 136 and 140 may switch tools connected to their end effectors at first and second tool change stations 152 and 156, respectively. Switching tools may include disconnecting one tool from an end effector at a tool change station and connecting another tool from the tool changing station. Examples of tools in a tool change system include cutting tools (e.g., torches), drill bits, reaming bits, deburring bits, and other types of tools.

Cameras 160 are mounted at multiple different locations vertically above the inspection robots 112 and 116, the cutting robots 136 and 140, the track 104, and the position where vehicle frames will sit within the station 100. The cameras 160 face vertically downward and capture images within the station 100. The control module 124 determines present locations of tools of the cutting robots 136 and 140 based on images from the camera. The cameras 160 may capture images at a predetermined frequency (e.g., 60 Hertz) and the control module 124 may update the present locations at the predetermined frequency based on the images, respectively. The cameras 160 are held vertically above the station 100 using a support structure, such as illustrated by 164. While an example orientation of the cameras 160 and number of cameras is provided, the present application is also applicable to other numbers and/or arrangements of cameras and support structures. For example, the cameras 160 may be disposed linearly vertically above the track 104 along a line that is parallel to the track 104.

The structure 164 is configured to dampen vibration at the cameras 160. The structure 164 may include, for example, hollow steel tubes and hollow steel posts that are disposed on cement pads that are separate from the floor of the station 100. In various implementations, the steel posts may be filled with sand or another suitable material to dampen vibration.

Two or more fiducials 168 are fixed to the floor of the station 100, such as on the first and second sides of the track 104. The control module 124 may identify the fiducials 168 in the images from the cameras 160. Locations of the fiducials 168 can be used by the control module 124 to determine absolute coordinates of items within the station 100.

In various implementations, the first and second cutting robots 136 and 140 may include magnets 172 located on or near the end effectors. The magnets 172 may be configured to catch material cut in (metallic) vehicle frames by the cutting robots 136 and 140.

Figure 2:
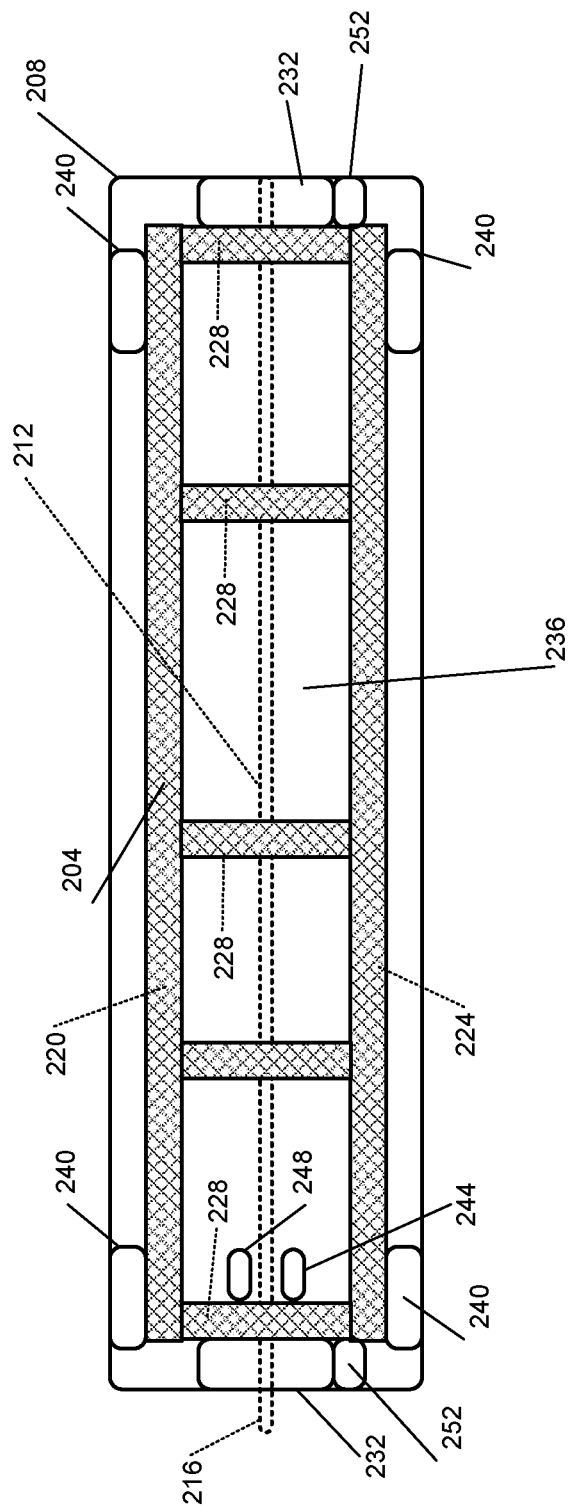
FIG. 2 is a top view and an illustration of an example vehicle frame on a vehicle frame cart.
Figure 3:
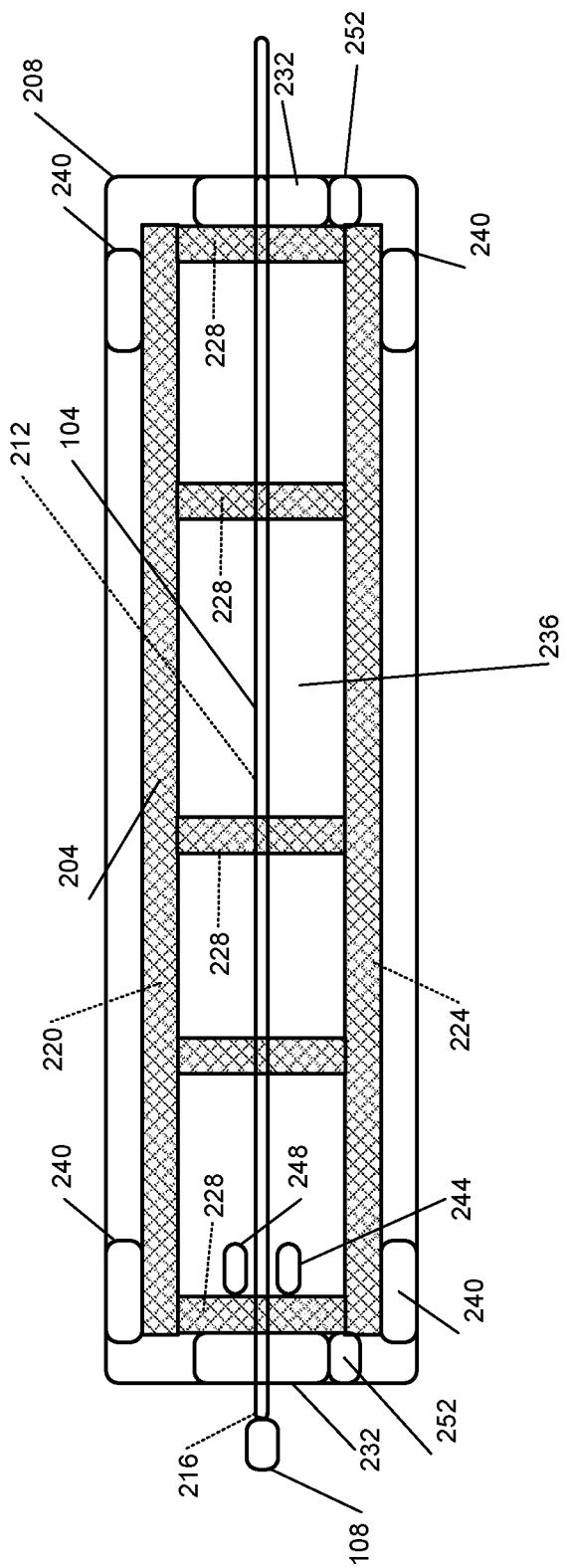
FIG. 3 includes an example illustration of a guide member of a vehicle frame cart within a track.

FIG. 2 is a top view and an illustration of an example vehicle frame 204 on a vehicle frame cart 208. The frame cart 208 includes a guide member 212 configured to fit within the track 104 and guide the frame cart 208 within the track 104. The guide member 212 may include an extension member 216 that extends longitudinally past a front or rear end of the frame cart 208 and that is configured to contact the stop 108. The guide member 212 may be linear and extend parallel a longitudinal axis of the frame cart 208. FIG. 3 includes an example illustration of the guide member 212 within the track 104.

The vehicle frame 204 includes frame rails 220 and 224. The vehicle frame 204 also includes two or more crossmembers 228 that extend between the frame rails 220 and 224. While an example vehicle frame configuration is provided, the present application is applicable to other vehicle frames.

The frame cart 208 includes front and rear frame holders 232 that hold the vehicle frame 204 vertically above a floor 236 of the frame cart 208. The floor 236 may be flat or include one or more features (e.g., recessed portions). Cuttings from the vehicle frame 204 may be caught by the floor 236 and also a catch basin under the frame cart 208, as discussed further below.

The frame cart 208 rolls on wheels 240. The wheels 240 may be disposed at or near corners of the frame cart 208. One or more of the wheels 240 may be driven by one or more electric motors, respectively, such as electric motor 244. The electric motor(s) may output torque to propel the frame cart 208 in response to application of power from a battery 248. The control module 124 may control the application of power to the electric motor(s) to control movement of the vehicle frame 204 and the frame cart 208. Alternatively, a control module of the frame cart 208 may control the application of power to the electric motor(s), such as based on user input to one or more input devices to the frame cart 208. A control module may control the application of power to the electric motor(s), for example, move the frame cart 208 into and out of the station 100. In various implementations, a human may move the frame cart 208 and the vehicle frame 204. While the example of the frame cart 208 is provided, the present application is also applicable to other types of frame moving devices, such as automated guiding vehicles (AGVs).

In various implementations, the fame cart 208 may include one or more electric motors 252 configured to rotate the frame holders 232 and the vehicle frame 204. The electric motors 252 may rotate the frame holders 232, for example, to position the bottom of the vehicle frame 204 vertically upward under some circumstances, such as for the detection of one or more of the identifiers on the frame by the inspection robots 112 and 116.

Figure 4:
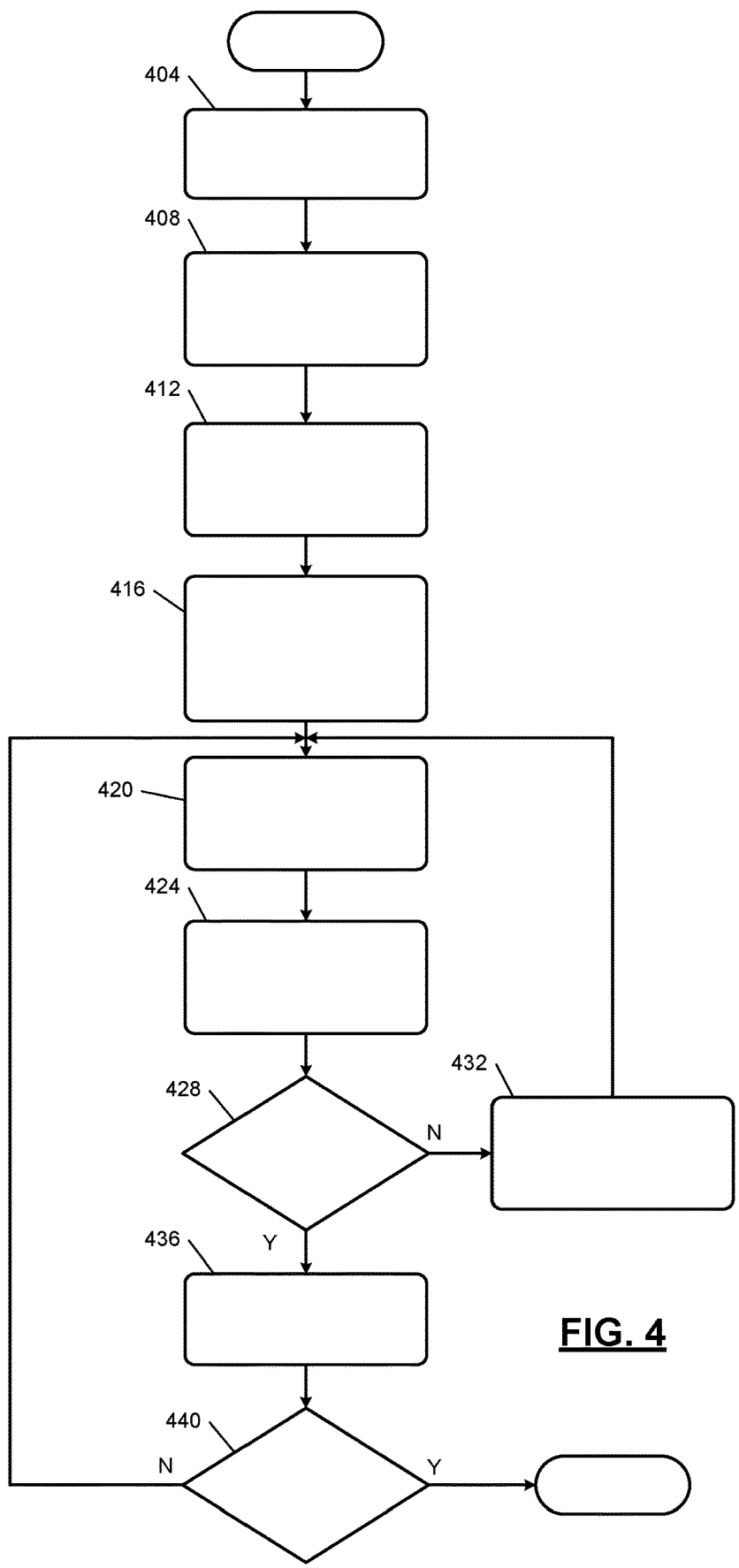
FIG. 4 is a flowchart depicting an example method of cutting holes in a vehicle frame using an inspection and cutting station/system.

FIG. 4 is a flowchart depicting an example method of cutting holes in a vehicle frame using the station 100. Control begins with 404 where the frame cart 208 holding the frame 204 is moved into the station 100. The guide member 212 of the frame cart 208 is moved within the track 104 until the extension member 216 contacts the stop 108. A control module may move the frame cart 208 or the frame cart 208 may be moved by one or more humans.

At 408, the cameras 160 capture images of the station and the control module 124 determines locations of the fiducials 168 based on the images from the cameras 160. The locations of the fiducials 168 can be used to determine absolute coordinates within the station 100.

At 412, the control module 124 moves and actuates the inspection robots 116 to determine the locations of the identifiers on the vehicle frame 204. The control module 124 detects the identifiers in the images from the cameras 128 and 132. The control module 124 may determine the locations of the identifiers based on the images from the cameras 128 and 132 and positions of the inspection robots 116 and/or based on images from the cameras 160. The control module 124 may also determine a 6DOF pose of the vehicle frame 204 based on the images from the cameras 128 and 132.

At 416, the control module 124 determines the target locations and characteristics (e.g., size and shape) of holes to be cut in the vehicle frame 204, such as based on the locations of the identifiers. The control module 124 may determine the target locations and characteristics further based on predetermined stored data for the vehicle frame 204.

At 420, the control module 124 receives images from the cameras 160 facing downward and capturing the tools of the cutting robots 136 and 140 and the identifiers 148 on the cutting robots 136 and 140. At 424, the control module 124 determines the locations of the tools of the cutting robots 136 based on the images from the cameras 160.

At 428, the control module 124 determines whether the location of a tool is at a target location on the vehicle frame 204. In various implementations, the control module 124 may control movement and actuation of the cutting robots 136 and 140 concurrently toward target locations. If 428 is false, the control module 124 controls one or both of the cutting robots 136 and 140 toward target locations at 432, and control returns to 420. If 428 is true, control continues with 436.

At 436, the control module 124 controls the one of the cutting robots 136 and 140 at its target location and cuts the hole with the characteristics at the target location through the vehicle frame 204. The control module 124 may also actuate the one of the cutting robots 136 and 140 to perform one or more other processes, such as reaming, drilling, deburring, etc. At 440, the control module 124 determines whether all of the holes to be cut in the vehicle frame 204. If 440 is false, control returns to 420. If 440 is true, control ends and the vehicle frame 204 can be removed from the station 100.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle frame inspection and cutting system comprising:
    a frame moving device configured to support a vehicle frame and to transport the vehicle frame;
    an inspection robot including a first camera configured to capture first images of a side of the vehicle frame;
    a cutting robot configured to cut holes through vehicle frames and including an identifier disposed on an outer surface of the cutting robot;
    a second camera disposed vertically above the frame moving device, the inspection robot, and the cutting robot and configured to capture second images vertically downwardly;
    a control module configured to, based on the first images and the second images:
        move and actuate the cutting robot and position a cutting tool of the cutting robot at a target location on the vehicle frame; and
        cut a hole through the vehicle frame at the target location.

2. The system of claim 1 wherein the cutting tool is configured to cut holes using one of plasma cutting, laser cutting, and water jet cutting.

3. The system of claim 1 further comprising a structure configured to support the second camera vertically above the frame moving device, the inspection robot, and the cutting robot.

4. The system of claim 3 wherein the structure includes hollow tubular members.

5. The system of claim 4 wherein at least one of the hollow tubular members is filled with a material.

6. The system of claim 5 wherein the material is sand.

7. The system of claim 3 wherein posts of the structure are disposed on cement pads that are isolated from a floor below the frame moving device.

8. The system of claim 1 wherein the control module is configured to:
    identify a datum on the side of the vehicle frame in at least one of the first images; and
    determine the target location based on a location of the datum.

9. The system of claim 8 wherein the control module is configured to move and actuate the inspection robot to position the datum within a field of view of the first camera.

10. The system of claim 1 wherein the control module is configured to set at least one of (a) a dimension of the hole at the target location and (b) a shape of the hole at the target location.

11. The system of claim 1 wherein the control module is configured to:
    determine a location of the cutting tool based the identifier disposed on the outer surface of the cutting robot captured in one of the second images; and
    move and actuate the cutting robot and position the location of the cutting tool at the target location on the vehicle frame.

12. The system of claim 1 wherein the control module is configured to determine a 6 degree of freedom pose of the vehicle frame based on the first images.

13. The system of claim 1 further comprising fiducials disposed on a floor within a field of view of the second camera.

14. The system of claim 1 further comprising a track, wherein the frame moving device includes a guide configured to move along the track.

15. The system of claim 14 further comprising a stop disposed at an end of the track, wherein a portion of the guide is configured to contact the stop.

16. The system of claim 1 wherein the inspection robot includes an N degree of freedom robot, wherein N is an integer greater than or equal to 4.

17. The system of claim 1 wherein the cutting robot includes an N degree of freedom robot, wherein N is an integer greater than or equal to 4.

18. The system of claim 1 further comprising:
    a second inspection robot including a third camera configured to capture third images of a second side of the vehicle frame;
    a second cutting robot configured to cut holes through vehicle frames and including a second identifier disposed on an outer surface of the second cutting robot;
    a third camera disposed vertically above the frame moving device, the second inspection robot, and the second cutting robot and configured to capture fourth images vertically downwardly,
    wherein the control module is further configured to, based on the third images and the fourth images:
        move and actuate the second cutting robot and position a second cutting tool of the second cutting robot at a second target location on the vehicle frame; and
        cut a second hole through the vehicle frame at the second target location.

19. The system of claim 1 further comprising a tool changing workstation configured to receive the cutting tool from the cutting robot and to provide a second tool to the cutting robot.

20. A vehicle frame inspection and cutting method comprising:
    by a frame moving device, supporting a vehicle frame and transporting the vehicle frame;
    capturing first images of a side of the vehicle frame using a first camera of an inspection robot;
    using a second camera disposed vertically above the frame moving device, the inspection robot, and a cutting robot, capturing second images vertically downwardly;
    based on the first images and the second images, move and actuate the cutting robot and positioning a cutting tool of the cutting robot at a target location on the vehicle frame; and cutting a hole through the vehicle frame at the target location by the cutting robot.

\* \* \* \* \*